N. W. GREEN.

Method of Constructing Artesian Wells.

No. 4,372. Reissued May 9, 1871.

N. W. Green

Witnesses.
Fred Haynes
Orlando B. Ormsby

UNITED STATES PATENT OFFICE.

NELSON W. GREEN, OF AMHERST, MASSACHUSETTS.

IMPROVEMENT IN METHODS OF CONSTRUCTING ARTESIAN WELLS.

Specification forming part of Letters Patent No. 73,425, dated January 14, 1868; Reissue No. 4,372, dated May 9, 1871.

*To all whom it may concern:*

Be it known that I, NELSON W. GREEN, of Amherst, in the county of Hampshire and State of Massachusetts, have invented a new and Improved Method of Constructing Artesian Wells; and I do hereby declare that the following is a full, clear, and exact description of the same, reference being had to the accompanying drawings, forming part of this specification.

My invention is particularly intended for the construction of Artesian wells in places where no rock is to be penetrated.

The methods of constructing wells previous to this invention were what have been known as "sinking" and "boring," in both of which the hole or opening constituting the well was produced by taking away a portion of the earth or rock through which it was made.

This invention consists in producing the well by driving or forcing down an instrument into the ground until it reaches the water, the hole or opening being thus made by a mere displacement of the earth, which is packed around the instrument and not removed upward from the hole, as it is in boring.

The instrument to be employed in producing such a well, which, to distinguish it from "sunk" or "bored" wells, may be termed a "driven" well, may be any that is capable of sustaining the blows or pressure necessary to drive it into the earth; but I prefer to employ a pointed rod, which, after having driven or forced down until it reaches the water, I withdraw and replace by a tube made air-tight throughout its length, except at or near its lower end, where I make openings or perforations for the admission of water, and through and from which the water may be drawn by any well-known or suitable form of pump.

In certain soils the use of a rod preparatory to the insertion of a tube is unnecessary, as the tube itself, through which the water is to be drawn, may be the instrument which produces the well by the act of driving it into the ground to the requisite depth.

To enable others to make and use my invention, I will proceed to describe it with reference to the drawings, in which—

Figure 1:
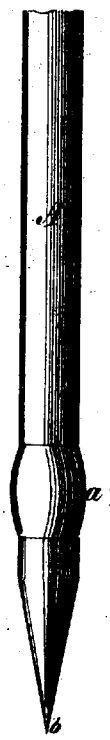
Figure 2:
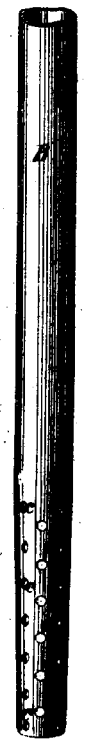

Figure 1 represents a portion of the pointed rod above mentioned, and Fig. 2 a portion of the tube which forms the casing or lining of the well.

The driving-rod A, I construct of wood or iron or other metal, or of parts of each, with a sharp point, *b*, of steel or otherwise, to penetrate the earth, and a slight swell, *a*, a short distance above the point, to make the hole slightly larger than the general diameter of the rod. This rod I drive by a falling weight or other power into the earth until its point passes sufficiently far into the water to procure the desired supply. I then withdraw the rod and insert in its place the air-tight iron or wooden tube B, which may be slightly contracted at its lower end to insure its easy passage to its place. In general this tube B I make of iron and of a thickness that will bear a force applied at its upper extremity sufficient to drive or force it to its place, and where a large or continuous flow of water is desired I perforate this tube near its lower end to admit the water more freely to the inside.

The perforations *c* may be about one-half of an inch in diameter, less or more, and from one to one and a half inch apart, and the perforations may extend from the bottom of the tube upward from one to two feet. The diameter of the tube should be somewhat smaller than the diameter of the swell *a* on the drill end of the driving-rod A.

In localities where the water is near the surface of the ground and the well is for temporary use only, as in the case of a moving army or for temporary camps, lighter and thinner materials than iron may be used for making the tubes—as, for instance, zinc, tin, copper, or sheet metal of other kind, or even wood, may be used.

The rod may be of any suitable and practical size that can be readily driven or forced into the ground, and may be from one to three inches in diameter.

In some cases the water will flow out from the top of the tube without the aid of a pump. In other cases the aid of a pump to draw the water from the well may be necessary. In the latter cases I attach to the tube by an air-tight connection any known form of pump.

What I claim as my invention, and desire to secure by Letters Patent, is—

The process of constructing wells by driving or forcing an instrument into the ground until it is projected into the water without removing the earth upward, as it is in boring, substantially as herein described.

N. W. GREEN.

Witnesses:

SYDNEY E. SMITH,

W. MORRIS SMITH.